United States Patent [19]

Higashimura et al.

[11] Patent Number: 4,591,440
[45] Date of Patent: May 27, 1986

[54] MEMBRANES FOR LIQUID SEPARATIONS

[75] Inventors: Toshinobu Higashimura, Kyoto; Toshio Masuda, Ohtsu, both of Japan

[73] Assignee: Toray Industries, Incorporated, Tokyo, Japan

[21] Appl. No.: 656,607

[22] Filed: Oct. 1, 1984

[30] Foreign Application Priority Data

Sep. 30, 1983 [JP] Japan ............................. 58-180852

[51] Int. Cl.$^4$ ............................................. B01D 13/00
[52] U.S. Cl. ................................. 210/640; 210/500.2; 210/654
[58] Field of Search ................ 210/500.2, 640, 651, 210/654; 526/279, 285

[56] References Cited

U.S. PATENT DOCUMENTS 4,393,113  7/1983  Sugie et al. .................... 526/279

FOREIGN PATENT DOCUMENTS 62494     10/1982  European Pat. Off. .
57-136905  8/1982  Japan ........................... 210/651
58-89607   5/1983  Japan ........................... 526/279
95541      6/1983  Japan .
58-206611 12/1983  Japan ........................... 526/279

OTHER PUBLICATIONS

H. Eustache et al., "Separation of Aqueous Organic Mixtures by Pervaporation and Analysis by Mass Spectrometry or a Coupled Gas Chromotograph-Mass Spectrometer" *J. Membrane Sci.* 8, 105–114 (1981).
K. C. Hoover et al., "Pervaporation by a Continuous Membrane Column" *J. Membrane Sci.*, 10, 253–271 (1982).
S. Kimura et al., "Pervaporation of Organic Substance Water System with Silicone Rubber Membrane" *Membrane*, 8, 177–183 (1983).
S. Kimura et al., "Pervaporation of Alcohol–Water Mixtures with Silicone Rubber Membrane" *Membrane* 7, 353–354 (1982).
E. Nagy et al., "Membrane Permeation of Water–Alcohol Binary Mixtures" *J. Membrane Sci.*, 7, 109–118 (1980).
M. H. V. Mulder et al., "Ethanol–Water Separation by Pervaporation" *J. Membrane Sci.*, 16, 269–284 (1983).

*Primary Examiner*—S. Leon Bashore
*Assistant Examiner*—K. M. Hastings
*Attorney, Agent, or Firm*—Scully, Scott, Murphy & Presser

[57] ABSTRACT

Provided is a membrane for liquid separation which comprises mainly poly(substituted acetylene) having a repeating unit represented by the following formula:

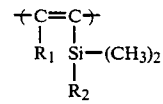

wherein $R_1$ represents a hydrogen atom or a methyl group, and $R_2$ represents an alkyl group having from 1 to 3 carbon atoms.

7 Claims, No Drawings

MEMBRANES FOR LIQUID SEPARATIONS

FIELD OF THE INVENTION

The present invention relates to novel membranes for liquid separations, and more particularly to pervaporation membranes for liquid separations.

Recently, membrane separation processes for the liquid separation have been applied to waste water treatment, desalination of sea-water and brakish water, and the separation and concentration of a solute, or the recovery of a solvent from various solutions in food industry and medical field. Such membrane separation processes are expected to be largely developed in near future.

The membrane separation process is one of separation techniques, in which the separation, concentration or purification is made depending upon the size and the quality of a substance dissolved in a solution. Such processes are known as pervaporation, reverse osmosis and osmotic extraction, and applications of these processes are decided according to the purpose and the substance to be treated. The pervaporation process is defined as a technique in which a liquid solution to be treated is fed on one side of a membrane, while the system on the opposite side of the membrane is evacuated or swept with a stream of a carrier gas, whereby the component permeating through the membrane is evaporated and taken out in a gaseous state. This technique has been investigated intensively in Europe and Japan. The advantages of this process are that it can be applicable to the separation of an azeotropic mixture which can not be separated by an ordinary distillation, separation of a mixture of compounds having close boiling points, concentration of a compound which is sensitive to heat, or separation of isomers of, for example, xylene, and these separations or concentration are applicable over the entire range of compositions of the liquid solution to be treated as is different from the reverse osmosis process.

On the other hand, a fear of the exhaustion of petroleum resources has recently occurred, and attempts to use the petroleum-substituting energy resources such as alcohols obtained through fermentation of a biomass such as corn have been studied in various countries. However, the concentration of ethanol obtained through fermentation of biomass is less than 10%, and a large amount of energy is necesssary for obtaining an absolute ethanol as a fuel through distillation. Consequently, this technique has not been practically used except for the special countries at present. Thus, the development of the energy-saving separation techniques which can substitute the distillation have variously been tried, and among them, the membrane separation techniques, particularly the pervaporation has intensively been studied as the most promising process.

As exemplified by the separation of ethanol from an aqueous solution thereof, in most cases of the known pervaporation membranes, water permeates selectively, and there is known only a case of certain kind of silicone rubbers, in which ethanol permeate selectively instead of water.

An example in which a silicone rubber membrane is applied to the separation of ethanol is disclosed by, for instance, Kimura et al. in Membrane, 7, 353 (1982), but it shows quite unsatisfied result in respect of separation characteristics and permeation performances.

The pervaporation process using an ethanol-permselective membrane has advantages in the following two respects rather than a water-permselective membrane in the separation of a liquid mixture of ethanol and water.

(1) Since the concentration of an aqueous ethanol solution produced by fermentation is less than 10%, the amount of necessary heat of vaporization may be smaller in the case of the permeation of ethanol which accounts for 10% of the aqueous solution than in the case of the permeation of water which accounts for 90% thereof, thus achieving energy saving.

(2) The ethanol-permselective membrane can deal with a 10% aqueous ethanol solution 9 times, per unit membrane area, as much as that in the case of the water-permselective membrane, when the permeation flow rate is the same.

For these reasons, there has eagerly been expected the development of ethanol-permselective membrane which is excellent in separation characteristics and permeation flow rate.

Although description has been made by way of example on the liquid mixture of ethanol and water, the pervaporation can be applied to the separation of various kind of liquid mixture as mentioned thereinafter. A typical example is a liquid mixture of water-soluble organic substance and water represented by aforementioned liquid mixture of ethanol and water. As the water-soluble organic substance, mention may be made of, for instance, water-soluble alcohols such as methanol or n- and iso-propanol, water-soluble ethers such as dioxane. From the industrial viewpoint, it is an important problem to recover methanol, ethanol, n- or iso-propanol, dioxane or the like from their dilute aqueous solution, so the development of the pervaporation membrane is being eagerly demanded.

SUMMARY OF THE INVENTION

It is an object of the present invention to provide novel membranes for liquid separations, particularly, novel pervaporation membranes.

A further object of the invention is to provide a method for separating a liquid mixture.

The foregoing and other objects of the present invention can be attained by the membrane comprising mainly a polymer having a main repeating unit of the following formula:

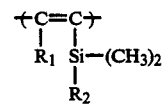

wherein $R_1$ represents a hydrogen atom or a methyl group, and $R_2$ represents an alkyl group having from 1 to 3 carbon atoms.

DESCRIPTION OF THE PREFERRED EMBODIMENTS

The membrane for liquid separation according to the present invention can be produced mainly from a polymer of a substituted acetylene monomer represented by the following formula:

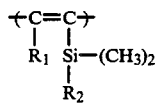

wherein $R_1$ and $R_2$ are the groups as defined above.

The examples of such substituted acetylene monomers, are $CH{\equiv}CSi(CH_3)_3$, $CH_3C{\equiv}CSi(CH_3)_3$, $CH{\equiv}CSi(CH_3)_2.C_2H_5$, $CH_3C{\equiv}CSi(CH_3)_2.C_2H_5$, $CH{\equiv}Si(CH_3)_2.C_3H_7$, $CH_3C{\equiv}CSi(CH_3)_2.C_3H_7$ and the like.

The poly(substituted acetylene) of the formula (I) can be prepared by solution-polymerization from one or more kind of the substituted acetylene monomers in the presence of catalyst, for example, tantalum pentachloride.

The polymerization of such a substituted acetylene monomer can be easily performed according to the methods as disclosed in, for example, Japanese Patent Publication Nos. 37,312/1976, 20,511/1977, 43,037/1979, 23,565/1980 and 30,722/1980, and Japanese Patent Laid-Open Nos. 31,911/1982, 36,106/1982, 32,608/1983 and 95,541/1983 of the present inventors. The intrinsic viscosity $[\eta]$ of the poly(substituted acetylene) used in the present invention is 0.5 to 100 dL/g, preferably 2 to 10 dL/g at 30° C. in toluene. If it is less than 0.5 dL/g, the membrane could not be formed succesively, while if it is higher than 100 dL/g, the viscosity of the polymer solution is too large to make uniform thickness of membrane. The degree of polymerization of the polymer is: $\overline{M_n}=20{,}000-2{,}000{,}000$ and $\overline{M_w}=30{,}000-3{,}000{,}000$, preferably, $\overline{M_n}=100{,}000-1{,}000{,}000$ and $\overline{M_w}=200{,}000-1{,}500{,}000$ in terms of polystyrene according to gel permeation chromatography.

$\overline{Mn}$ represents the number average molecular weight, and $\overline{Mw}$ represents the weight average molecular weight.

The membrane of the present invention can be obtained from the poly(substituted acetylene) or the polymer copolymerized with other monomer(s), or blend polymer with other polymer(s) so long as the performances thereof are not damaged.

In general, the poly(substituted acetylene) is dissolved in a solvent, the solution is cast on an appropriate surface (such as a glass plate), the solvent is evaporated to obtain a film, and the film is peeled off by appropriate means to give a membrane. Alternatively, the membrane can be obtained as an asymmetric or anisotropic membrane by the partial evaporation of the solvent followed by coagulation in a coagulating medium, according to the well known method for producing an asymmetric reverse osmosis membrane from an ordinary membrane material such as cellulose acetate. Further, the polymer can be used as an active layer of a composite membrane which is obtained by directly application of a diluted polymer solution onto a microporous substrate and evaporating the solvent to form a ultrathin active layer onto microporous substrate.

Any organic solvent can be used for obtaining the membrane according to the present invention, so long as it can dissolve the poly(substituted acetylene) well and can be easily evaporated to form the membrane. For instance, the use of hydrocarbon solvents such as benzene, toluene, cyclohexane, or n-hexane, halogenated hydrocarbon solvents such as carbon tetrachloride or chloroform may give satisfied results.

Though the film thickness of the membrane comprising the poly(substituted acetylene) according to the present invention is not specifically restricted, it is ordinarily preferable to be in a range of 0.01 to 500 μm. However, the thinner film thickness within such a range that the separation performance may not be lowered is more preferable. On the other hand, it may be increased within such a range that the permeation flow rate may not be lowered for practical use.

The membrane obtained is in a form of a flat sheet membrane which can be incorporated into a liquid separator known as a spiral type, a plate and frame type, or a tubular type. Further, the membrane can be formed into a hollow fiber or a composite hollow fiber, and it can be incorporated into a liquid separator of the hollow fiber type for use. However, the present invention is not dependent on the form of the membrane used.

In the case of the practical use of the membrane according to the present invention, it is common that a liquid mixture (for instance, a liquid mixture of ethanol and water) is fed on one side of the membrane, while the opposite side is evacuated. The pressure on the feed side may be in the range of 1 to 100 atm and, industrially, the pressure is preferably near the atmospheric pressure. To the contrary, it is preferable that the pressure on the vacuum side is as low as possible, and the pressure in the range of 0.1 to 100 mmHg is industrially used.

The membrane comprising mainly the poly(substituted acetylene) according to the present invention exhibits excellent performances as the pervaporation membrane permeable to water-soluble organic substances. The reason therefor is not clear. When the film productivity and the separation performance are taken into account, a polymer of $CH_3C{\equiv}CSi(CH_3)_3$ is particularly useful.

The alternating double bonds forming the main chain of the poly(substituted acetylene) are considered to contribute to the provision of the rigidity of the molecular chain in respect of the film productivity, but the polymer in which the double bonds may be partially reduced by, for example, hydrogenation in such an extent that the separation performance is not adversely affected, can be used.

The following Examples and Comparative Examples will prove the usefulness of the liquid separation membrane according to the present invention particularly in the separation of a liquid mixture of water-soluble alcohol and water, and a liquid mixture of water-soluble ether and water. Wherein the separation factor α and the permeation flow rate Q are calculated by the following formulae:

$$\alpha_B^A = \frac{C_A^1/C_B^1}{C_A^\circ/C_B^\circ}$$

$C^1$ is the concentration of component in the permeate, $C^\circ$ is the concentration in the liquid feed, and A and B refer to the respective components. For instance, in $\alpha_{H_2O}^{EtOH}$ in which A and B are ethanol and water respectively, $C^\circ_A$ is the concentration (%) of the ethanol in a feed, $C^\circ_B$ is that (%) of the water in the feed, $C^1_A$ is that (%) of the ethanol on the permeation side, and $C^1_B$ is that (%) of the water on the permeation side.

$Q = W/A$ wherein W is the permeation amount per hour (kg/hr), and A is the area (m²) of the membrane.

The following examples are illustrative of the invention but are not in limitation thereof.

EXAMPLE 1

One gram of 1-trimethylsilyl-1-propyne was dissolved in 5 ml of toluene and the solution was added to 71 mg of tantalum pentachloride dissolved in 5 ml of toluene. Reaction was carried out at 80° C. for 24 hours. Thereafter, the reaction was stopped by adding methanol thereto, and purification was made with toluene-methanol to obtain 0.9 g of polymer. The yield was 90%, and the intrinsic viscosity and the molecular weight of the obtained polymer were: $[\eta] = 5.4$ dL/g, and $\overline{M}_n = 600,000$ and $\overline{M}_w = 850,000$, respectively.

The polymer was dissolved in cyclohexane to prepare a 3% solution. After this solution was cast in a thickness of 210 μm on a glass plate, the solvent was evaporated at 50° C. for 1 hour to obtain a uniform film of 4.3 μm in thickness. Separation of a liquid mixture of ethanol and water was measured by using this film according to the pervaporation under the conditions where the feed was a 10% aqueous ethanol solution, the temperature of the feed was 30° C., the pressure of the feed was 1 atm, and the pressure of the permeation side was 10 mmHg. The high separation factor and high permeation flow rate of the membrane are indicated by the data represented in Table 1.

COMPARATIVE EXAMPLE 1

A polymer obtained from $CH \equiv CC(CH_3)_3$ was dissolved in n-hexane to prepare a 6.8% solution. After this solution was cast in a thickness of 210 μm on a glass plate, the solvent was evaporated at 50° C. for 1 hour to obtain a uniform film of 20.8 μm in a thickness. Separation of a 10% aqueous ethanol solution was measured by using the obtained film according to the pervaporation under the same conditions as in Example 1. The results are set out in Table 1.

COMPARATIVE EXAMPLE 2

RTV silicone rubber solution (SH 780, a product of Toray Silicone Co., Ltd.) was cast in a thickness of 500 μm on a Teflon plate, and cross-linked at room temperature to obtain a uniform film of 70 μm in thickness. Separation of a liquid mixture of ethanol and water was made by using the obtained film according to the pervaporation under the conditions where the feed is a 10% aqueous ethanol solution, the temperature of the feed was 30° C., the pressure of the feed was 1 atm, and the pressure of the permeation side was 10 mmHg. The results are set out in Table 1.

EXAMPLE 2

The polymer obtained from $CH_3C \equiv CSi(CH_3)_3$ was dissolved in cyclohexane to prepare a 3% solution. After this solution was cast in a thickness of 500 μm on a glass plate, the solvent was evaporated at 50° C. for 1 hour to obtain a uniform film of 10.7 μm in thickness. Separation of a liquid mixture of methanol and water was made by using the obtained film according to the pervaporation under the conditions where the feed was a 9.2% aqueous methanol solution, the temperature of the feed was 30° C., the pressure of the feed was 1 atm, and the pressure of the permeation side was 10 mmHg. The results are set out in Table 1.

EXAMPLE 3

Separation of a liquid mixture of isopropanol and water was made by using the same film as in Example 2 according to the pervaporation under the conditions where the feed was a 13.0% aqueous isopropanol solution, the temperature of the feed was 30° C., the pressure of the feed was 1 atm, and the pressure of the permeation side was 10 mmHg. The results are set out in Table 1.

EXAMPLE 4

Separation of a liquid mixture of dioxane and water was made by using the same film as in Example 2 according to the pervaporation under the same conditions as in Example 2 except that the feed was a 6.1% aqueous dioxane solution. The results are set out in Table 1.

EXAMPLE 5

A polymer obtained from $CH_3C \equiv CSi(CH_3)_2 \cdot C_2H_5$ was dissolved in cyclohexane to prepare a 3% solution. The intrinsic viscosity and the molecular weight of the obtained polymer were: $[\eta] = 6.0$ dL/g, $\overline{M}_n = 700,000$ and $\overline{M}_w = 900,000$, respectively. After this solution was cast in a thickness of 500 μm on a glass plate, the solvent was evaporated to obtain a uniform film of 10.5 μm in thickness. Separation of a liquid mixture of ethanol and water was made by using the obtained film according to the pervaporation under the conditions where the feed was a 10% aqueous ethanol solution, the temperature of the feed was 30° C., the pressure of the feed was 1 atm, and the pressure of the permeation side was 10 mmHg. The results are set out in Table 1.

TABLE 1

| | Feed (A/H₂O) | $\alpha^A_{H_2O}$ | Q(kg/m² · hr) |
|---|---|---|---|
| Example 1 | EtOH/H₂O | 30.43 | 1.91 |
| Comparative Example 1 | EtOH/H₂O | 0.41 | 0.086 |
| Comparative Example 2 | EtOH/H₂O | 7.21 | 0.067 |
| Example 2 | MeOH/H₂O | 9.37 | 0.31 |
| Example 3 | i-PrOH/H₂O | 10.26 | 0.54 |
| Example 4 | Dioxane/H₂O | 8.62 | 0.34 |
| Example 5 | EtOH/H₂O | 12.57 | 0.37 |

What is claimed is:

1. A method for separating a liquid mixture comprising separating a liquid mixture across a membrane, said membrane comprising poly(substituted acetylene) having the formula:

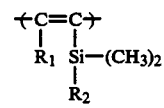

where $R_1$ is a hydrogen atom or a methyl group and $R_2$ is an alkyl group having from one to three carbon atoms, whereby said liquid mixture is separated by pervaporization.

2. A method according to claim 2 wherein $R_1$ and $R_2$ are both methyl groups.

3. A method according to claim 1, wherein said liquid mixture is a mixture of a water-soluble organic substance and water.

4. A method according to claim 3, wherein said water-soluble organic substance is a water-soluble alcohol.

5. A method according to claim 3, wherein said water-soluble organic substance is a water-soluble ether.

6. A method according to claim 4, wherein said water-soluble alcohol is one selected from methanol, ethanol and propanol.

7. A method according to claim 5, wherein said water-soluble ether is dioxane.

* * * * *

UNITED STATES PATENT AND TRADEMARK OFFICE
CERTIFICATE OF CORRECTION

PATENT NO. : 4,591,440

DATED : May 27, 1986

INVENTOR(S) : T. Higashimura, et al.

It is certified that error appears in the above-identified patent and that said Letters Patent is hereby corrected as shown below:

In the Claims:

Claim 2 should read:

--A method according to claim 1 wherein $R_1$ and $R_2$ are both methyl groups.--

Signed and Sealed this

Sixth Day of January, 1987

Attest:

DONALD J. QUIGG

Attesting Officer

Commissioner of Patents and Trademarks